US005253677A

United States Patent [19]

Sand

[11] Patent Number: 5,253,677

[45] Date of Patent: Oct. 19, 1993

[54] CHEMICAL EDUCTOR WITH INTEGRAL ELONGATED AIR GAP

[75] Inventor: William F. Sand, Cincinnati, Ohio

[73] Assignee: Hydro Systems Company, Cincinnati, Ohio

[21] Appl. No.: 934,709

[22] Filed: Aug. 24, 1992

Related U.S. Application Data

[63] Continuation-in-part of Ser. No. 732,469, Jul. 18, 1991, Pat. No. 5,159,958.

[51] Int. Cl.[5] .................... F16K 1/00

[52] U.S. Cl. .................... 137/888; 137/896

[58] Field of Search .................... 137/888, 896

[56] References Cited

U.S. PATENT DOCUMENTS

| | | | |
|---|---|---|---|
| 1,102,505 | 7/1914 | Henderson | 137/888 |
| 1,195,915 | 8/1916 | Damrow | 137/888 |
| 2,250,291 | 7/1941 | Boosey | 137/111 |
| 2,288,247 | 6/1942 | Kunstorff | 137/111 |
| 3,072,137 | 1/1963 | McDougall | 137/216 |
| 3,166,086 | 1/1965 | Holmes | 137/217 |
| 3,273,866 | 9/1966 | Lancy | 261/19 |
| 3,826,474 | 7/1974 | Pareja | 137/888 |
| 3,865,136 | 2/1975 | Vershuur | 137/896 |
| 4,416,610 | 11/1983 | Gallagher, Jr. | 137/888 |
| 4,633,909 | 1/1987 | Louboutin et al. | 137/888 |
| 4,697,610 | 10/1987 | Bricker et al. | 137/3 |
| 4,721,126 | 1/1988 | Horii | 137/1 |

FOREIGN PATENT DOCUMENTS

| | | |
|---|---|---|
| 216557 | 5/1908 | Fed. Rep. of Germany . |
| 1428452 | 8/1964 | Fed. Rep. of Germany . |

*Primary Examiner*—A. Michael Chambers
*Attorney, Agent, or Firm*—Wood, Herron & Evans

[57] ABSTRACT

An improved venturi eductor for proportional dispensing of chemicals into flowing water includes a large antisiphoning air gap section to satisfy water system regulations. The air gap section includes an outer wall and an inner wall with a gap between the walls. Both walls include offset windows that provide a circuitous path from the center of the air gap to the exterior of the unit. Passageways extend from the gap to a downstream section of the unit to carry away fluid that might collect in this gap. Further, the shape and location of various orifices within the device creates a slight suction to further limit overspray.

6 Claims, 2 Drawing Sheets

CHEMICAL EDUCTOR WITH INTEGRAL ELONGATED AIR GAP

This is a continuation-in-part application, Ser. No. 07/732,469, filed Jul. 18, 1991, entitled "Chemical Eductor With Integral Elongated Air Gap" now U.S. Pat. No. 5,159,958 issued Nov. 3, 1992.

BACKGROUND OF THE INVENTION

It is a common practice for chemicals such as those used for cleaning and sanitizing to be purchased as concentrated liquids. The chemicals are mixed with water to achieve the desired usage concentration. A variety of proportioning dispensers have been developed to achieve this. These dispense mixtures at use concentration. The dispensers often employ venturi devices sometimes called eductors to proportion the chemical and deliver this for use. Water traveling through the central portion of the venturi creates suction which draws the chemical into the water stream. The amount of chemical educted is controlled by a metering orifice in the chemical feed line.

The concentrations desired in this type of chemical dispensing varies greatly ranging from 1:1 to over 1:1000. The devices also must function with a wide range of water pressures, temperatures and dissolved minerals and gases. In some of these conditions, the eductors function much like classical flow venturies, while in other they are more like jet pumps. The devices are mechanically simple, generally without moving parts, but small details of the construction have important influence on their performance.

It is usually desirable to operate these dispensers with water provided directly from the public water supply. In this situation, the dispensers are subject to the regulations of the public water departments who are concerned about preventing any possibility of the chemical concentrates entering the water system. Such an event is known as back flow when caused by positive pressure, back syphoning when the flow is caused by suction in the water system.

A variety of devices and techniques exist to prevent backflow and back syphoning. The most effective mechanical backflow devices and the ones most accepted by the public water departments are relatively large, expensive devices which require regular testing and certification. The installation and inspection of these devices is often more expensive than the acquisition and installation of the dispensers themselves.

The regulations regarding backflow and back syphoning and the research supporting them generally recognize the simple air gap is the most effective protection of all. The simplest illustration of an air gap is a faucet whose end is above the top of the sink. If there is any suction from the water system, it cannot pull in anything from the sink, only air.

It is known to combine a venturi eductor with an air gap for back syphoning protection for dispensing applications. Such devices are described in U.S. Pat. Nos. 4,697,610 and 3,166,086 as well as U.S. Pat. Nos. 3,072,137 and 3,273,866. These function in specific applications. However, their air gaps are generally less than half an inch, and many standards require that the air gap be at least one inch.

In such applications where such a large air gap is employed, it is difficult to control the proportioning of the venturi and also difficult to prevent collateral spray from being emitted from the air gap.

Devices that include baffling to prevent collateral spray are disclosed in Kunstorff U.S. Pat. No. 2,288,247 and Boosey U.S. Pat. No. 2,250,291. Neither of these devices are directed at chemical eductors and therefore they have no concern with effectively proportioning the educted chemical. Further, the structures disclosed in these devices would be unsuitable for chemical eductors. The geometry for a chemical eductor is very precise.

The essential geometry of a venturi is that of an enlargement in a contained stream of fluid. According to Bernoulli's theory, suction is created at the point where the flow channel widens. The operation of the venturi requires that the entering fluid stream have a certain amount of flow energy. For an air gap eductor, this means that the stream must cross the air gap and enter the venturi developing appreciable pressure within the entrance of the venturi.

The geometry which will create this includes a nozzle diameter somewhat larger than the smallest diameter of the front part of the venturi along with a funnel structure leading to this venturi orifice. Not all the water volume from a water jet can enter the venturi and some degree of overflow is created.

The performance of the nozzle is critical for the correct operation of the unit. It must discharge a well defined stream across the air gap and into the venturi inlet.

Such concerns are not present in siphon breakers and back flow preventors for water systems which are merely concerned with backflow. Such critical dimensions are certainly not a problem for chemical eductors that have relatively small air gaps or where those where overspray is not a critical concern.

SUMMARY OF THE INVENTION

Accordingly, it is an object of the present invention to provide a chemical eductor which incorporates a long air gap generally at least one inch.

Further, it is an object of the present invention to provide such a chemical eductor which effectively proportions chemicals over a wide range of concentrations.

Further, it is an object of the present invention to provide such an eductor which does not emit overspray from the eductor and which minimizes foaming.

The objects and advantages of the present invention are attained by a chemical eductor assembly which includes an entrance nozzle followed by an elongated air gap chamber followed by a second nozzle leading into a chemical eductor venturi. The air gap chamber has a series of openings. The chamber also includes barriers alongside each opening. The barriers are spaced from the openings to provide a passage from inside the air gap chamber to outside the eductor. Downstream of this is a chamber containing a venturi eductor.

A passageway from the air gap chamber to the chemical eductor chamber is provided. The passageway leads from between the barriers and openings in the air gap chamber. Thus, any liquid that accumulates in between the barriers and openings will flow into the discharge instead of possibly dripping from the air gap chamber openings.

Further, an inner discharge tube is extended below the bottom of the eductor housing to minimize foaming.

The objects and advantages of the present invention will be further appreciated in light of the following detailed description and drawings in which:

DETAILED DESCRIPTION

Figure 2:
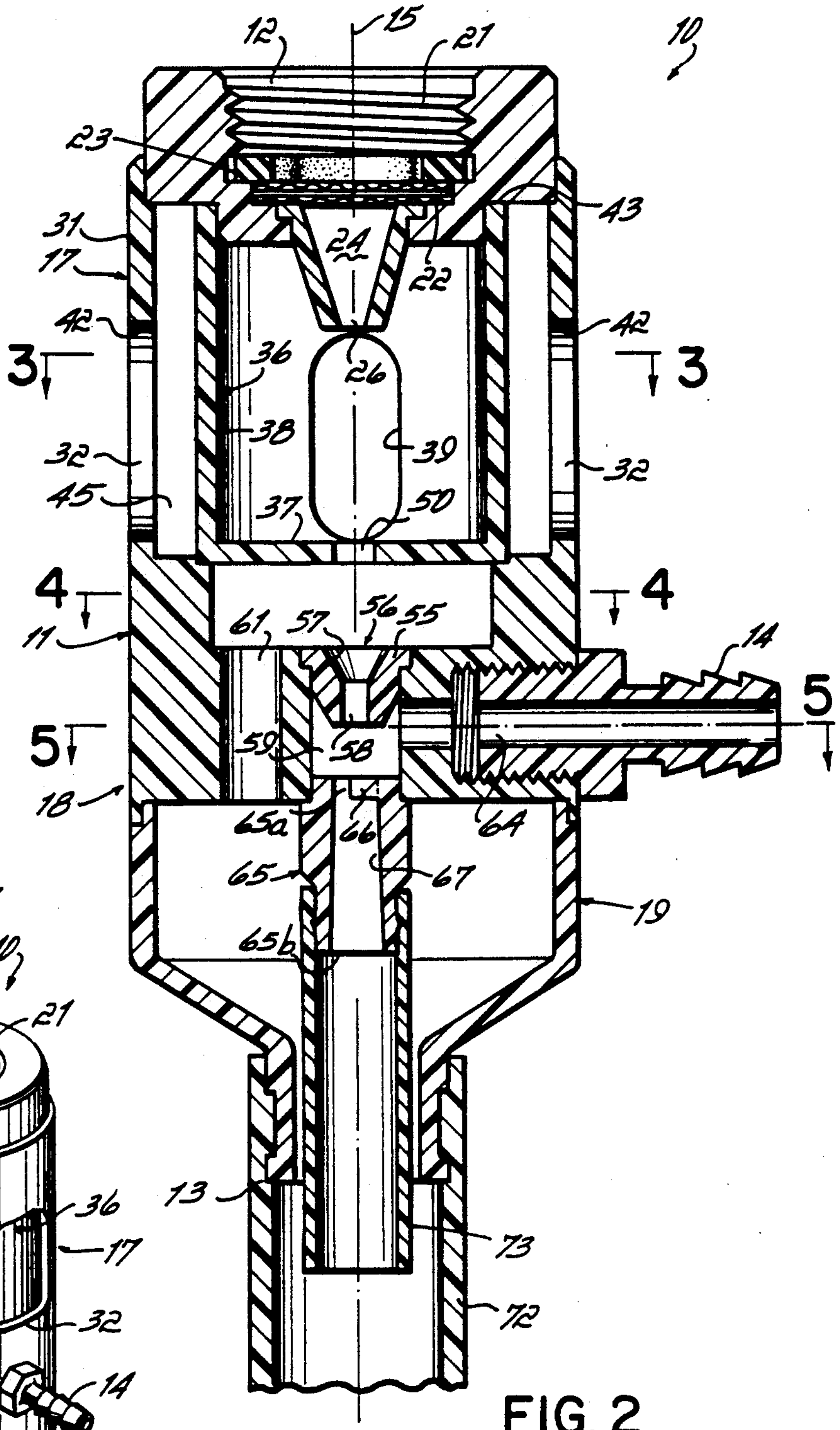
FIG. 2 is an axial cross-sectional view taken at lines 2—2 of FIG. 1.
Figure 1:
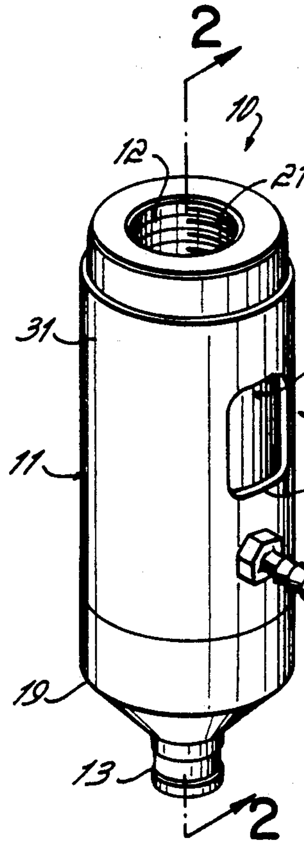
FIG. 1 is a perspective view of the present invention.

The present invention is a chemical eductor 10 which includes an outer body 11 having an upstream water inlet 12, a downstream water outlet 13 and a chemical inlet 14 as shown in FIGS. 1 and 2. The water flows along the central axis 15 of the eductor 10 through an inlet nozzle 24, across an air gap section 17 through the eductor section 18 into the collection section 19.

Upstream of the inlet nozzle 24 is a threaded inlet 21 adapted to screw onto a water source (not shown). At the downstream side of the threaded inlet 21 is a flow stabilizer shown as a set of strainers 22 which are held in place by washer 23. The flow stabilizer serves to help the nozzle deliver a dense, columnar stream. This in turn leads to truncated, converging nozzle 24 which terminates at orifice 26.

Orifice 26 is directly centered along the central axis or axial flow path 15 of the eductor 10. Downstream of the nozzle 24 is the air gap chamber 17. Air gap chamber 17 includes an exterior tubular body 31 with a plurality of oval windows 32 (two shown in FIGS. 2 and 3). The top 42 of the windows is above the outlet of nozzle 24, and the distance between outlet of nozzle 24 and the bottom of the windows is at least one inch.

Located within the air gap chamber 17 is an insert 36 which includes an annular disc base 37 and barrier means which are in line with the windows 32. The barrier means is shown as a tubular body 38 concentric to body 31. Barrier body 38 is shown with a plurality of windows 39 (two shown in FIG. 3) which are offset 90° from windows 32. The tops and bottoms of windows 39 are located relative to nozzle 24 in the same way as are windows 32.

Figure 3:
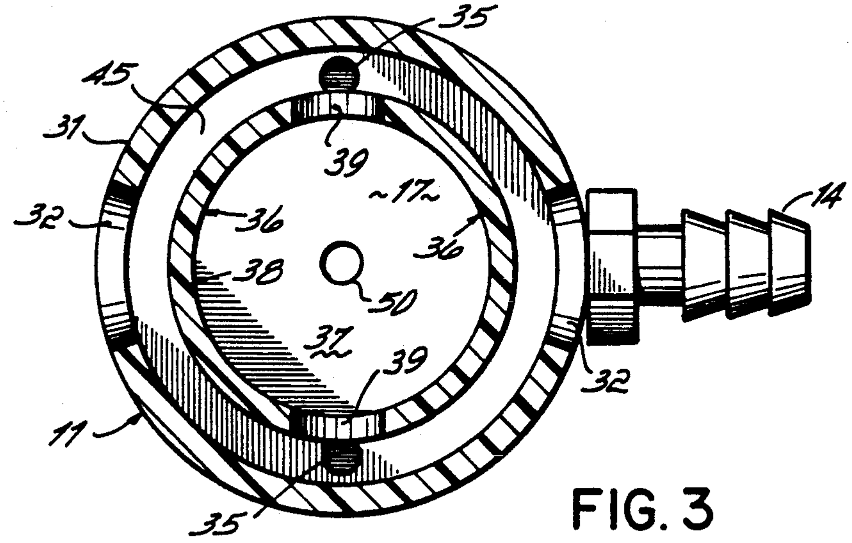
FIG. 3 is an overhead cross-sectional view taken at lines 3—3 of FIG. 2.
Figure 4:
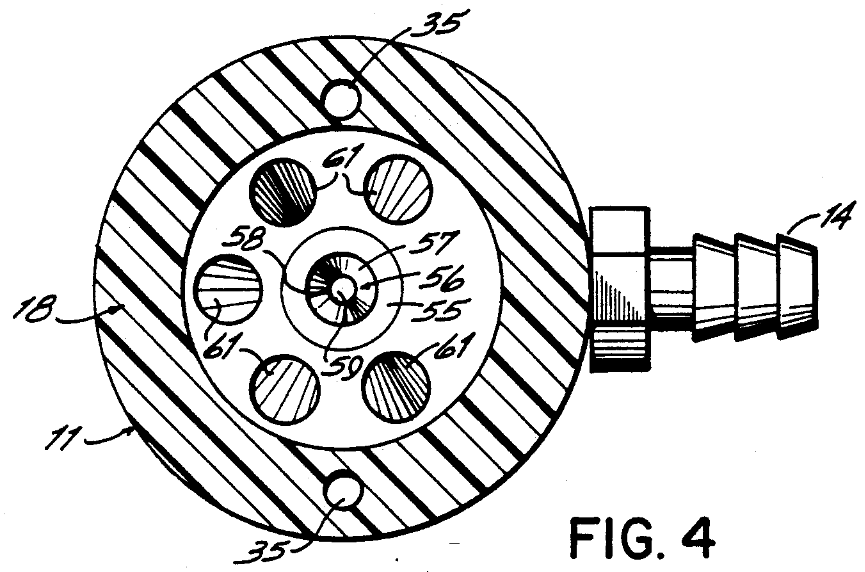
FIG. 4 is an overhead cross-sectional view taken at lines 4—4 of FIG. 2.

As shown in FIGS. 2 and 3, an upper edge 43 of barrier wall 38 extends above the upper (upstream) edges 42 of windows 32, respectively. Barrier body 38 is spaced from tubular body 31 a distance effective to permit fluid flow in the event of siphoning. Generally, this distance should be at least 0.09″. A plurality of passageways 35 extend from the area 45 between tubular bodies 31 and 38 down to the collection section 19. Passageways 35 are shown immediately below windows 39.

The disc base 37 includes a central opening or orifice 50. The orifice 50 is aligned again with the central axis 15 of the eductor. This orifice opens to the eductor section 18. Disc base 37 is optional and can be eliminated providing a clear opening from nozzle 24 to nozzle 55. It can also be sloped downwardly if desired.

Eductor section 18 includes an eductor nozzle 55 which is spaced about half an inch from the orifice 50 of disc portion 37. The eductor nozzle 55 includes an entrance or upstream opening 56 which leads through a sloped conical portion 57 to an orifice 58. With collector unit 19 are overflow passages extending from the area upstream of nozzle 55 to the collection section 19.

As shown more particularly in FIG. 2, the overflow passages 61 bypass the eductor section 18 and lead to collection section 19 beneath the eductor section 18.

The eductor section 18 downstream of the air gap section 17 includes a chamber 59 and a chemical feed passage 64 which passes from the chemical inlet 14 to the downstream side of orifice 58.

Figure 5:
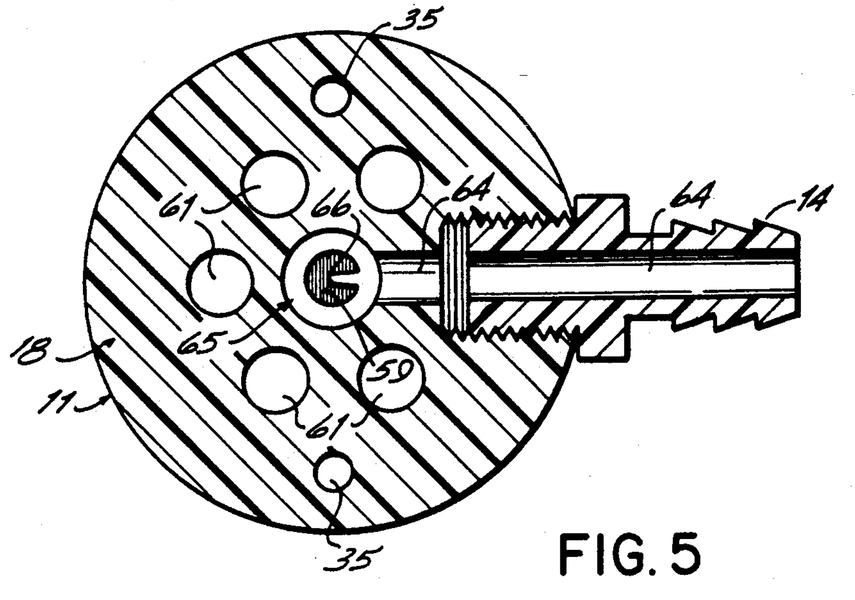
FIG. 5 is an overhead cross-sectional view taken at lines 5—5 of FIG. 2.

Downstream of orifice 58 is the venturi diffuser tube 65 which includes an inlet 65*a* and an outlet 65*b*. The interior wall 67 of venturi 65 as shown is slightly tapered at about 2°. The inlet 65*a* of the venturi tube is shown approximately 3/32 of an inch from the orifice 58. Slightly downstream of the opening 65*a* within the venturi tube 65 is a flooder pin 66 (FIGS. 2 and 5) which is used to cause a small turbulence in the diffuser to assure that the flowing water completely fills the diffuser, even at low water flows. Other means can be used to flood the diffuser, including a flow obstruction at the end of the diffuser. The venturi tube 65 resides within collection section 19 and leads to outlet 13.

In use, a discharge tube 72 is fixed to outlet 13 to transport fluid. An optional tubular extension 73 which serves to reduce foaming is shown extending from the venturi tube 65 beyond and downstream of outlet 13 into the discharge tube 72.

In operation, the threaded inlet 21 is connected to a source of water such as a hose or faucet. The threaded chemical inlet 14 is attached to a source of chemical such as a jug of liquid washing solution. Turning the water supply on forces water through the stabilizing strainer 22 through nozzle 24. This will create a narrow stream of water which will pass directly through the center of the air gap chamber 17 through the opening 50 in the disc base 37 striking the conical section 57 of educator nozzle 55.

The water will then force its way through the orifice 58 and continue to the venturi diffuser 65. There it will expand and create a suction within the chamber 59 connected to 64. This will in turn draw the chemical from the supply through the chemical inlet 14 and passage 64 where it will mix in chamber 59 with the water passing through the orifice of the venturi tube 65.

Some water which strikes the sloped portion 57 of the educator nozzle 55 will overflow and spray. The disc plate 37 acts as a spray shield. The overflowed water drains through passageways 61 into the collection section 19. Mist that passes up beyond disc plate 37 and through windows 39 will collect in area 45 and flow through passageways 35 into collection section 19. A slight negative pressure in chamber 19 from operation of the educator promotes this flow.

There is also a slight negative pressure through passageways 35. Thus, overspray or mist is pulled down these passageways.

If there should be suction from the water supply, the one inch air gap 17 provided in the air gap chamber will prevent any of the chemical entering through entrance 14 from being drawn into the water supply because air would be pulled in through the windows 32 instead of chemical or diluted solution being pulled up.

The relationship between the sizes of orifices of nozzle 24 and 58 greatly influence performance. Best results are obtained when at least 15% of the flow through nozzle 24 overflows the entrance of 58. The included angle of the lead-in to 58 should be at least 30 degrees since a sharper angle does not allow a smooth overflowing.

The diameter of 65*a* should be at least about 0.030" greater than that of 58 and may be much greater to allow rich mixtures. Exact educator performance is optimized for specific tasks by modifying key features including nozzles 24 and 58, lead-in 57, and the diameter, length, and flare of the bore of the diffuser 65.

There are obviously many different ways that the educator of the present invention can be manufactured and modified and designed, yet still incorporate the features of the present invention. For example, the windows 39 in barrier body 38 can be lengthened into slots. This would leave two arcuate tabs in place of body 38. Further, the disc 37 can be eliminated if desired. Tubular extension 13 is preferred but optional.

Accordingly, the invention should only be defined by the appended claims wherein I claim:

1. A chemical eductor with integral air gap comprising a water inlet and a first nozzle;

an elongated air gap chamber between said first nozzle and a second venturi nozzle downstream of said first nozzle said air gap chamber having an outer wall and at least one window, a barrier spaced from said outer wall blocking each of said windows, said barrier having one or more openings offset from each of said windows in said outer wall;

a venturi diffuser tube downstream of said second venturi nozzle;

a chemical inlet into an area between said second venturi nozzle and said venturi diffuser;

an overspray chamber above said second venturi nozzle communicating with a collection chamber downstream of said second nozzle passage means extending from inside the outer wall of said air gap chamber to said collection chamber.

2. The chemical eductor claimed in claim 1 further comprising a third nozzle downstream of said air gap section and upstream of said second venturi nozzle.

3. The apparatus claimed in claim 2 wherein said second venturi nozzle includes a truncated conical inlet larger than the third nozzle.

4. The apparatus claimed in claim 1 wherein said outer wall has two windows and said barriers has two windows offset from said windows of said outer wall by 90°.

5. The eductor claimed in claim 4 wherein said inner wall is spaced at least 0.09" from said outer wall of said air gap section.

6. The eductor claimed in claim 1 having an outer discharge orifice and wherein said eductor section has a discharge tube which extends through and downstream of said discharge orifice.

* * * * *